United States Patent
Bilde

(10) Patent No.: US 9,854,742 B2
(45) Date of Patent: Jan. 2, 2018

(54) CROP PROCESSING APPARATUS IN A COMBINE HARVESTER

(71) Applicant: AGCO International GmbH, Hesston, KS (US)

(72) Inventor: Morten Leth Bilde, Langaa (DK)

(73) Assignee: AGCO International GmbH, Neuhausen (CH)

( * ) Notice: Subject to any disclaimer, the term of this patent is extended or adjusted under 35 U.S.C. 154(b) by 0 days.

(21) Appl. No.: 15/533,553

(22) PCT Filed: Dec. 15, 2015

(86) PCT No.: PCT/EP2015/079771
§ 371 (c)(1),
(2) Date: Jun. 6, 2017

(87) PCT Pub. No.: WO2016/096841
PCT Pub. Date: Jun. 23, 2016

(65) Prior Publication Data
US 2017/0325408 A1    Nov. 16, 2017

(30) Foreign Application Priority Data

Dec. 17, 2014  (GB) .................................. 1422467.9

(51) Int. Cl.
*A01F 12/44* (2006.01)
*A01F 12/46* (2006.01)
(Continued)

(52) U.S. Cl.
CPC ................ *A01F 12/44* (2013.01); *A01F 7/00* (2013.01); *A01F 12/30* (2013.01); *A01F 12/46* (2013.01)

(58) Field of Classification Search
CPC ........... A01F 12/44; A01F 12/45; A01F 12/46
(Continued)

(56) References Cited

U.S. PATENT DOCUMENTS 1,617,246 A * 2/1927 Freeman ............... A01F 12/446
460/10
2,574,010 A * 11/1951 Bjorndahl ............... A01F 12/44
209/481
(Continued)

FOREIGN PATENT DOCUMENTS

| DE | 38 23 115 A1 | 1/1990 |
| EP | 0 850 556 A | 7/1998 |
| EP | 2 740 347 A | 6/2014 |

OTHER PUBLICATIONS

UK Intellectual Property Office, International Search Report for Priority Document Application No. GB1422467.9, dated Jun. 9, 2015.
(Continued)

*Primary Examiner* — John Weiss

(57) ABSTRACT

A combine harvester including a grain pan arranged to catch a crop stream from threshing or separating apparatus. The grain pan is driven in an oscillating manner to convey the crop stream rearwardly to a rear edge. A cleaning unit including a fan for generating a cleaning airstream which is directed under the rear edge of the grain pan. The grain pan comprises includes a transversely corrugated surface and longitudinal gullies having a curved profile for compensating for side-hill operation.

10 Claims, 2 Drawing Sheets

(51) Int. Cl.
*A01F 7/00* (2006.01)
*A01F 12/30* (2006.01)

(58) Field of Classification Search
USPC .......................................... 460/8–10, 90–92
See application file for complete search history.

(56) References Cited

U.S. PATENT DOCUMENTS

| | | | |
|---|---|---|---|
| 4,018,232 A | | 4/1977 | Rowland-Hill et al. |
| 5,085,616 A | * | 2/1992 | Matousek ............... A01F 12/44 209/394 |
| 5,338,257 A | * | 8/1994 | Underwood ......... A01D 75/282 460/8 |
| 5,791,986 A | * | 8/1998 | Underwood ............ A01F 12/44 460/101 |
| 6,056,639 A | * | 5/2000 | Gryspeerdt ............. A01F 12/44 460/101 |
| 9,706,714 B2 | * | 7/2017 | Bussmann ............. A01D 41/12 |
| 2009/0163260 A1 | * | 6/2009 | Claes .................... A01F 12/444 460/100 |
| 2014/0066145 A1 | * | 3/2014 | Bilde ................... A01F 12/444 460/91 |

OTHER PUBLICATIONS

European Patent Office, International Search Report for parent International Patent Application No. PCT/EP2015/079771, dated May 17, 2016.

\* cited by examiner

CROP PROCESSING APPARATUS IN A COMBINE HARVESTER

FIELD OF INVENTION

The invention relates to combine harvesters and particularly to systems for transferring crop material from threshing and separating apparatus to a grain cleaning unit. More specifically the invention relates to conveyance systems which include grain pans arranged to catch a crop stream, the grain pans being driven in an oscillating manner to convey the crop stream rearwardly to a grain cleaning unit.

BACKGROUND

The process for cleaning grain in combine harvesters has not changed fundamentally for many decades. The cleaning unit, or 'shoe', has directed therethrough a cleaning airstream which is typically generated by a cross-flow or centrifugal fan located in front of the cleaning shoe. As a mix of grain kernels, chaff, tailings and straw is passed over one or more oscillating sieves, the cleaning airstream serves to blow the lighter material in a generally rearward direction over the sieves and out of the rear of the machine. The grain is generally heavier and/or smaller than the material other than grain (MOG) in the mix and passes through the sieves.

The cleaning shoe is most efficient when the grain is caused to settle on the uppermost sieve (hereinafter referred to as the chaffer) as early as possible and the lighter material is kept airborne. If the grain bounces on impact with the chaffer then the risk of the cleaning airstream carrying the grain out of the rear of the shoe increases. The speed of the cleaning airstream is typically selected to strike a balance between grain cleanliness and acceptable loss. Ultimately, this balance creates a limit on the capacity of the cleaning unit. In other words, without an increase in shoe size, any increase in capacity will adversely affect grain cleanliness and/or loss rate.

However, despite these limits, there remains a continuing drive to increase the size and capacity of combine harvesters to meet the needs of modern farmers and to speed up the overall harvesting process. As outlined above, increasing the throughput of the cleaning shoe with known technology requires an increase in the physical size. For example, increasing the width of the cleaning shoe would deliver an increased machine capacity but at the cost of increased machine width. However, maximum machine width is limited by road transport legislation in some countries thus rendering this option unattractive. In a similar vein, increasing the length of the chaffer would require an increase in wheel base and a consequential increase in turn radius which is undesirable to farmers.

Efforts to increase the capacity of the cleaning shoe based on pre-stratification of the crop stream have been made. For example, WO-2012/095239 discloses a combine harvester having an extended return pan which catches separated crop material from overhead threshing and separating apparatus and conveys such to a front edge from where it drops on to a grain pan, the grain pan conveying the crop mix rearwardly to a rear edge from where it falls into the cleaning shoe. In this disclosure, the return pan is of an extended construction to deliver the majority of the separated material to the front of the grain pan to facilitate enhanced stratification of the material before delivery to the cleaning shoe. As disclosed therein, the recognised advantage that the grain rich bottom layer falls directly onto the chaffer whereas the upper MOG-rich layer is rendered airborne by the cleaning airstream.

The process of stratification has been found to be very sensitive to working on side-hills. It is known to provide structure on the grain pan in the form of longitudinal fins which prevent the crop material from piling up on one side of the grain pan when operating on a side-hill. However, even the provision of such fins does not aid stratification of the grain and MOG.

SUMMARY OF INVENTION

It is therefore an object of the invention to compensate for the effects of side-hill conditions upon the stratification of crop material on a grain pan upstream of the cleaning shoe.

In accordance with the invention there is provided a combine harvester comprising:
  a grain pan arranged to catch a crop stream, the grain pan being driven in an oscillating manner to convey the crop stream rearwardly to a rear edge;
  a cleaning unit comprising a fan for generating a cleaning airstream which is directed under the rear edge;
  the grain pan comprising a transversely corrugated surface and a plurality of longitudinal gullies having a curved profile.

The invention involves the recognition that, in side-hill conditions for a conventional machine, the crop material piles up on the divider fins which are devoid of ripples or corrugated surface. The material therefore experiences a reduction in contact with the rippled pan floor. Moreover, the surface of the accumulated material is typically below horizontal due to the motion of the pan combined with the reduction in contact with the rippled floor. Both of these adversely affects the stratification of the crop material mix.

By provided corrugated gullies with a curved profile in accordance with the invention the crop material on the grain pan 'experiences' no difference when operating in side-hill conditions. Despite the side-hill the crop material remains in contact with a corrugated surface and, as a result, remains horizontal with respect to gravity.

The gullies may extend to the rear edge of the grain pan. In this case the gullies serve to funnel or focus the heavier grain-rich crop material into a plurality of discrete streams which fall over the rear edge of the grain pan. In this regard, the invention also involves the recognition that an evenly spread, albeit stratified, layer of crop material falling over the rear edge of the grain pan suffers in that the cleaning airstream passing under the edge thereof must pass through the relatively dense grain-rich layer to engage and lift the lighter MOG. By channelling the grain-rich bottom layer into a number of spaced discrete streams, gaps between the streams permit unobstructed passages (or vents) for the cleaning airstream to impact the lighter MOG-rich material.

The profile of the pan floor is preferably mimicked on the underside of the pan so as to influence the air profile. In other words, the profile of the pan floor is evident from the underside also. The profile of the pan minimizes or eliminates the airflow below the gullies while increasing the height and thereby air flow below the ridges in between. Increasing the total air flow (typically but not exclusive by increasing the rotation speed of the fan) will primarily increase the air flow below the ridges and only to a lower extent below the gullies or troughs. Differentiating the grain, MOG and air distribution across the width of the cleaning system in this manner allows for a higher total air flow to be employed without increasing the losses. In turn, this allows for an increase in the capacity of the cleaning system without increasing the spatial envelope required.

The curved profile is preferably circular.

The curved profile may include inwardly inclined sidewalls which has been found to enhance stratification of the crop material.

The invention lends itself to a combine harvester employing virtually any known type of threshing and separating apparatus. For example, the threshing and separating apparatus may be of the conventional type, a single or twin-axial type, or a hybrid system. A return pan is preferably located under the threshing and separating apparatus so as to catch crop material falling therefrom and convey such forwardly to a front edge wherein the front edge is positioned above the grain pan.

BRIEF DESCRIPTION OF SPECIFIC EMBODIMENTS

Further advantages of the invention will become apparent from reading the following description of specific embodiments with reference to the appended drawings in which.

DETAILED DESCRIPTION OF SPECIFIC EMBODIMENTS

The invention will be described in connection with various preferred embodiments. Relative terms such as front, rear, forward, rearward, left, right, longitudinal and transverse will be made with reference to the longitudinal vehicle axis of a combine harvester travelling in the normal direction of travel. The terms "direction of conveyance", "upstream" and "downstream" are made with reference to the general flow of crop material through the combine harvester.

Figure 1:
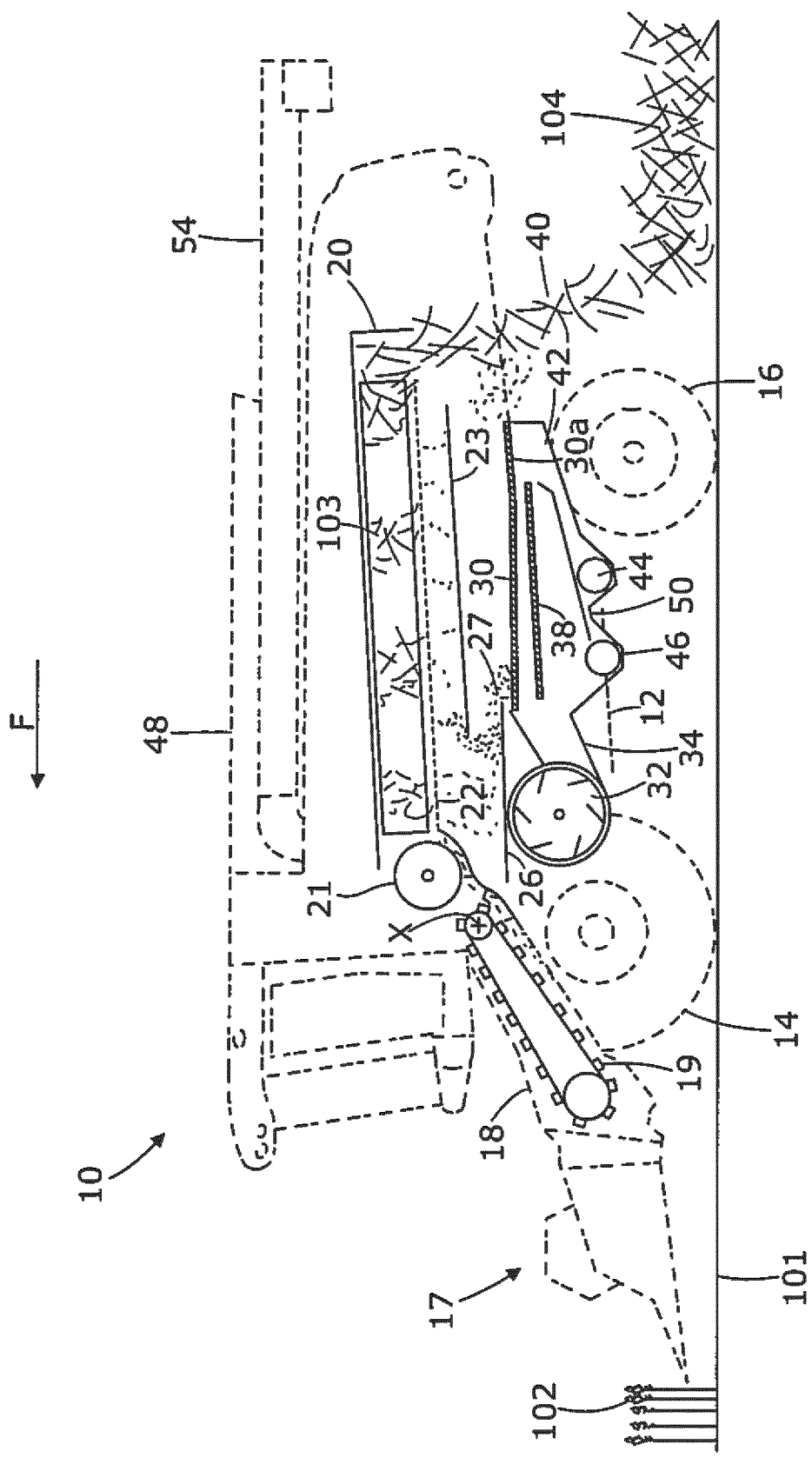
FIG. 1 is a schematic left side elevation view of a combine harvester having a crop material conveyance system suitable for embodying the invention.

With reference to FIG. 1 a combine harvester 10 includes a frame 12, front wheels 14 and rear steerable wheels 16, the wheels engaging with the ground 101. A cutting header 17 is detachably supported on the front of a feederhouse 18 which is pivotable about a transverse axis 'X' to lift and lower the header 17 in a conventional manner.

The combine 10 is driven in a forward direction (arrow F) across a field of standing crop 102 in a known manner. The header 17 serves to cut and gather the crop material before conveying such in to feederhouse 18 and the elevator 19 housed therein.

At this stage the crop stream is unprocessed. It should be understood that combine harvesters are employed to harvest a host of different crops including cereal, rice, corn and grass seed. The following description will make reference to various parts of a cereal crop stream but it should be understood that this is by way of example only and does not by any means limit the applicability of the invention to harvesting other harvested crops.

The cut crop stream is conveyed rearwardly from the feederhouse 18 to a processor designated generally at 20. The processor 20 of the illustrated combine includes an axial flow threshing and separating rotor which is fed at its front end by a feed beater 21. Axial flow rotor 20 serves to thresh the crop stream in a front region, separate the grain therefrom in a rear region, and eject the straw residue through the rear of the machine either directly onto the ground in windrow or via a straw chopper (not shown). A concaved grate 22 in the underside of the threshing and separating rotor 20 allows the separated material to fall by gravity onto a return pan 23 located below.

Although described in relation to an axial flow processor it should be understood that alternative processors known in the art may be employed instead. For example, a conventional, tangential flow, threshing cylinder with downstream straw walkers may replace the processor shown. In yet another alternatives, hybrid or transverse threshing technology may be employed.

Return pan 23 comprises a tray-like structure and serves to convey the collected grain forwardly (in the direction F) to a respective front edge thereof in a known manner. It should be understood that the term "pan" will be used for grain conveyance components which serve to convey grain in a given direction. This is in contrast to "sieves" which include a perforated structure to separate material and will be described in more detail below.

The single return pan 23 may be replaced by a dual return pan arrangement such as that described in WO-2015/062965 for example. Alternatively, a continuously driven belt may be employed.

At this stage in the process a mix of grain, kernels, chaff, un-threshed tailings and shorter straw have been separated from the majority of the straw residue, the separated mix having fallen through the concave or grate of processor 20 onto the return pan 23. The remaining straw residue 103 continues in a spiral path around the axial rotor 20 to the rear from where it is discharged onto the ground in a windrow 104.

The separated crop mix will hereinafter be referred to as a grain-MOG mix wherein MOG refers to Material Other than Grain and includes the tailings, straw and chaff.

The grain-MOG mix falls onto a grain pan 26 which will hereinafter be referred to as "stratification pan" 26 for reasons to become apparent below.

The stratification pan 26 is driven in a similar oscillating manner to the return pan, that is in a fore-and-aft oscillating motion which may be linear or partly circular. The stratification pan floor is transversely corrugated, or rippled, with a saw-toothed profile. The combination of the saw-toothed profile with the oscillating motion conveys the grain-MOG mix in a generally rearward direction towards a rear edge 27 from where the mix falls onto the front of a top sieve or chaffer 30.

As the grain-MOG mix falls from the stratification pan rear edge it is subjected to a cleaning airstream generated by fan unit 32 which includes a cross-flow fan in a fan housing. Ducting 34 directs the pressurised air under the rear edge 27, the airstream serving to blow the MOG upwardly and rearwardly towards the rear of the machine. This process will be described in more detail later on.

Chaffer 30 comprises adjustable louvres supported on a chaffer frame which is driven in fore-and-aft oscillating manner. The material which settles on the chaffer 30 is conveyed in a generally rearward direction and the heavier smaller grain-rich material passes between the louvres onto an underlying lower sieve 38, whereas the lighter larger material passes to the end of the chaffer and out of the rear of the machine at 40. A rear section of chaffer 30a may be independently adjustable and is configured to allow un-threshed tailings to pass therethrough into a re-threshing region 42 from where the tailings are conveyed to a re-threshing auger 44.

Lower sieve 38 is also driven in an oscillating manner to convey the collected grain-MOG mix rearwardly wherein the material falling therethrough is collected in a clean grain trough 46 for conveyance by an elevator (not shown) to a grain tank 48. Material which does not pass through lower sieve 38 and is instead conveyed off the rear edge thereof falls into re-threshing region 42 for subsequent re-threshing in accordance with known principles.

The airstream generated by fan unit 32 is also conveyed by ducting up through lower sieve 38 and chaffer 30 to encourage lifting of the MOG from the chaffer surface. For ease of reference hereinafter the chaffer 30, lower sieve 38, fan unit 32 will be collectively referred to as "the cleaning shoe 50". Moreover, the return pan 23 and stratification pan 26 will be referred to as "the crop material transfer system" which serves the purpose of transferring the material separated by the processor 20 to the cleaning shoe 50.

For completeness the combine 10 includes an unloading system which includes an unloading auger 54 shown in part in FIG. 1.

The above described operating principle of a combine harvester, and in particular the flow of crop material therethrough, is known in the art. The various inventive aspects relate to the crop material transfer system and especially to the construction and operation of stratification pan 26, these inventive aspects to be described below.

Stratification pan 26 serves to convey the collected grain-MOG mix in a rearward direction. During this conveyance it has been found advantageous to actively facilitate stratification of the different material types before reaching the rear edge 27 for presentation to the cleaning shoe 50. WO-2012/095239 discloses recognition of the advantages from enhanced stratification by depositing the material towards the front end of the pan 26. The action of conveyance itself serves to stratify the grain-MOG mix, wherein the heavier grain kernels work down to the bottom layer and the lighter MOG rises to the top layer. As the stratified material falls from the rear edge 27 the MOG already present on the top becomes airborne more easily without hindrance from the heavier grain, whereas the latter falls directly onto the chaffer 30 (optionally via a cascade pan) thus settling more efficiently with reduced grain bounce.

The inventive aspects follow on from this recognition and serve to encourage and facilitate stratification of the grain and MOG upstream of the cleaning shoe.

It is known to provide longitudinally aligned baffles or fins on the stratification pan 26 in a spaced manner to prevent the crop material moving to one side of the pan when working on hillsides and to maintain a substantially uniform loading across the width of the pan 26. However, resulting from efforts to enhance the aforementioned stratification process, it has been found that such fins so not assist with stratification and potentially even inhibit such.

Figure 2:
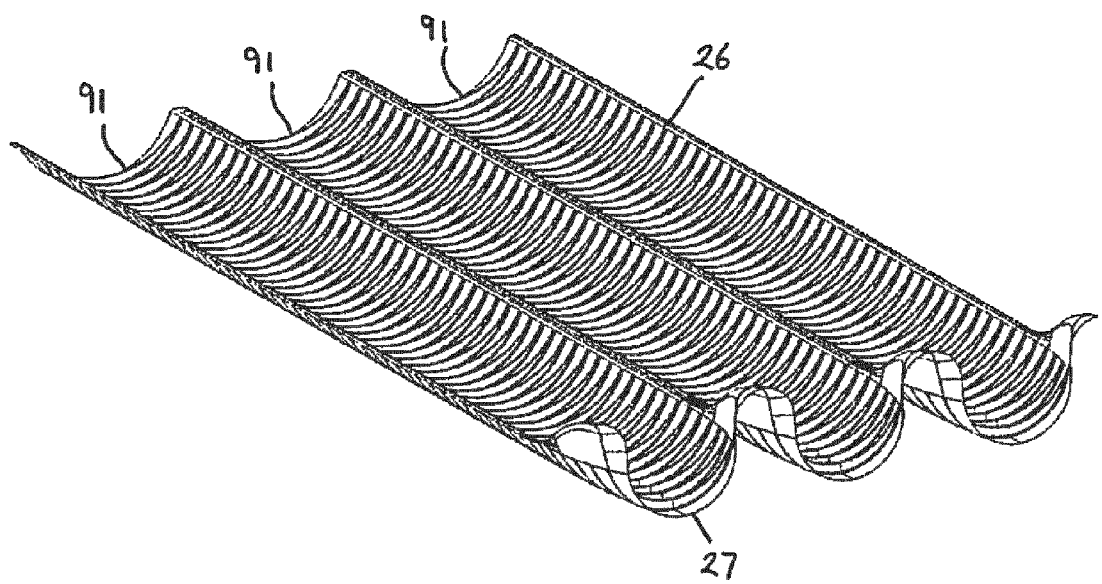
FIG. 2 is a top left rear perspective view of a grain pan in accordance with an embodiment of the invention.

FIG. 2 shows part of a grain, or "stratification", pan 26 in accordance with an embodiment of the invention, the pan 26 comprising a series of gullies 91 (alternatively termed troughs, channels or valleys) aligned in a longitudinal direction. Looking at a transverse section (as shown in FIG. 3) the gullies have a part-circular profile extending to the rear edge 27.

The gullies 91 have a transversely corrugated or rippled surface which serves to assist in the rearward conveyance of the crop material disposed thereon.

The curved profile of the gullies 91 ensures that the crop material mix does not experience any difference in the contact surface when operating in side-hill conditions. As illustrated in FIG. 3, the grain-rich lower layer G and the MOG-rich upper layer M both remain in contact with the corrugated surface and, as such, remain substantially level with the gravitational horizontal H.

Figure 3:
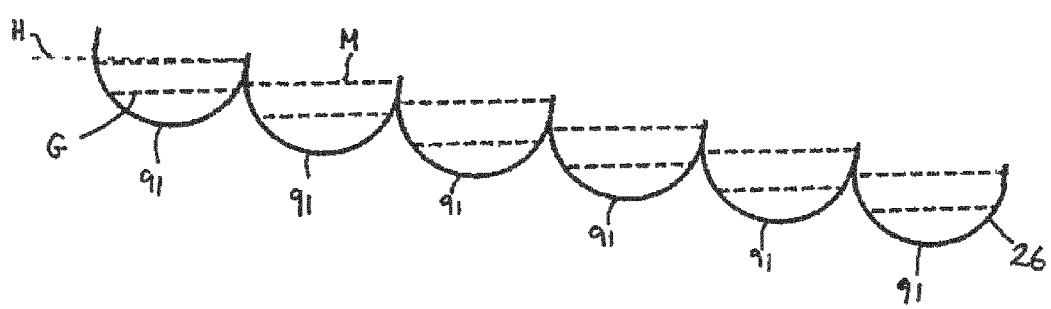
FIG. 3 is a highly schematic vertical section through a grain pan in accordance with an embodiment of the invention illustrating the crop material and shown operating on a side-hill.

It can be seen from FIGS. 2 and 3 that the side-by-side gullies 91 define a transverse floor profile of alternating ridges and troughs, the profile being more pronounced toward the rear edge 27. The profile encourages the formation of discrete streams of crop material which fall from the rear edge 27. Moreover, the profile is mimicked in the underside of the pan and, as such, affects the profile of the cleaning airstream passing under the rear edge 27. The profile of the pan minimizes or eliminates the airflow below the gullies while increasing the height and thereby air flow below the ridges. Increasing the total air flow (typically but not exclusive by increasing the rotation speed of the fan) will primarily increase the airflow below the ridges and only to a lower extent below the troughs. Differentiating the grain, MOG and air distribution across the width of the cleaning system in this manner allows for a higher total air flow to be employed without increasing the losses. In turn, this allows for an increase in the capacity of the cleaning system without increasing the spatial envelope required.

Although shown as extending from the front edge to the rear edge 27 of the stratification pan 26, it is envisaged that the gullies may extend along only a part of the length of the pan without departing from the scope of the invention.

The embodiment described herein above may additionally comprise a cascade pan disposed between the stratification pan and the chaffer, wherein the cascade pan is driven to oscillate and convey crop material falling from the rear edge of the stratification pan to the chaffer.

In summary there is provided a combine harvester comprising a grain pan arranged to catch a crop stream from threshing or separating apparatus. The grain pan is driven in an oscillating manner to convey the crop stream rearwardly to a rear edge. A cleaning unit comprises a fan for generating a cleaning airstream) which is directed under the rear edge of the grain pan. The grain pan comprises a transversely corrugated surface and a plurality of longitudinal gullies having a curved profile for compensating for side-hill operation.

It should be emphasized that the above-described embodiments of the present disclosure are merely possible examples of implementations, merely set forth for a clear understanding of the principles of the disclosure. Many variations and modifications may be made to the above-described embodiment(s) of the disclosure without departing substantially from the spirit and principles of the disclosure.

The invention claimed is:

1. A combine harvester comprising:
   threshing and separating apparatus;
   a cleaning unit;
   a crop material transfer system arranged to transfer a crop stream from the threshing and separating apparatus to the cleaning unit;
   wherein the crop material transfer system comprises a grain pan arranged to catch the crop stream, the grain pan being driven in an oscillating manner to convey the crop stream rearwardly to a rear edge of said grain pan;
   wherein the cleaning unit comprises a fan for generating a cleaning airstream which is directed under the rear edge of the grain pain;

the grain pan comprising a transversely corrugated surface and a plurality of longitudinal gullies having a curved profile.

2. The combine harvester according to claim 1, wherein the curved profile is part-circular.

3. The combine harvester according to claim 1, wherein the gullies extend from a front edge of the grain pan to the rear edge of the grain pan.

4. The combine harvester according to claim 1, wherein adjacent gullies abut one another forming a peak longitudinal edge in between said adjacent gullies.

5. The combine harvester according to claim 4, wherein said plurality of gullies extend across the entire width of the grain pan.

6. The combine harvester according to claim 1, wherein the curved profile includes inwardly inclined sidewalls.

7. The combine harvester according to claim 1, further comprising a frame to which the grain pan is journaled for oscillating motion, wherein lateral tilt of the grain pan relative to the frame is fixed.

8. The combine harvester according to claim 1, further comprising a cascade pan operable to oscillate, the cascade pan having a corrugated floor and being positioned so as to catch crop material falling from the rear edge of the grain pan and convey said material rearwardly to a cascade pan rear edge under which a further cleaning airstream is directed.

9. The combine harvester according to claim 1, further comprising threshing and separating apparatus, and a return pan located under the threshing and separating apparatus so as to catch crop material falling therefrom and convey such forwardly to a front edge of the return pan, wherein the front edge is positioned above the grain pan.

10. A combine harvester comprising:
a grain pan arranged to catch a crop stream, the grain pan being driven in an oscillating manner to convey the crop stream rearwardly to a rear edge of said grain pan;
a cleaning unit comprising a fan for generating a cleaning airstream which is directed under the rear edge of the grain pain;
the grain pan comprising a transversely corrugated surface and a plurality of longitudinal gullies having a curved profile,
wherein each gully narrows in a direction of conveyance.

* * * * *